June 22, 1926.
J. N. METTEL
1,590,048
COMBINATION MIRROR AND SUN BLINDER
Filed Jan. 20, 1926    2 Sheets-Sheet 1
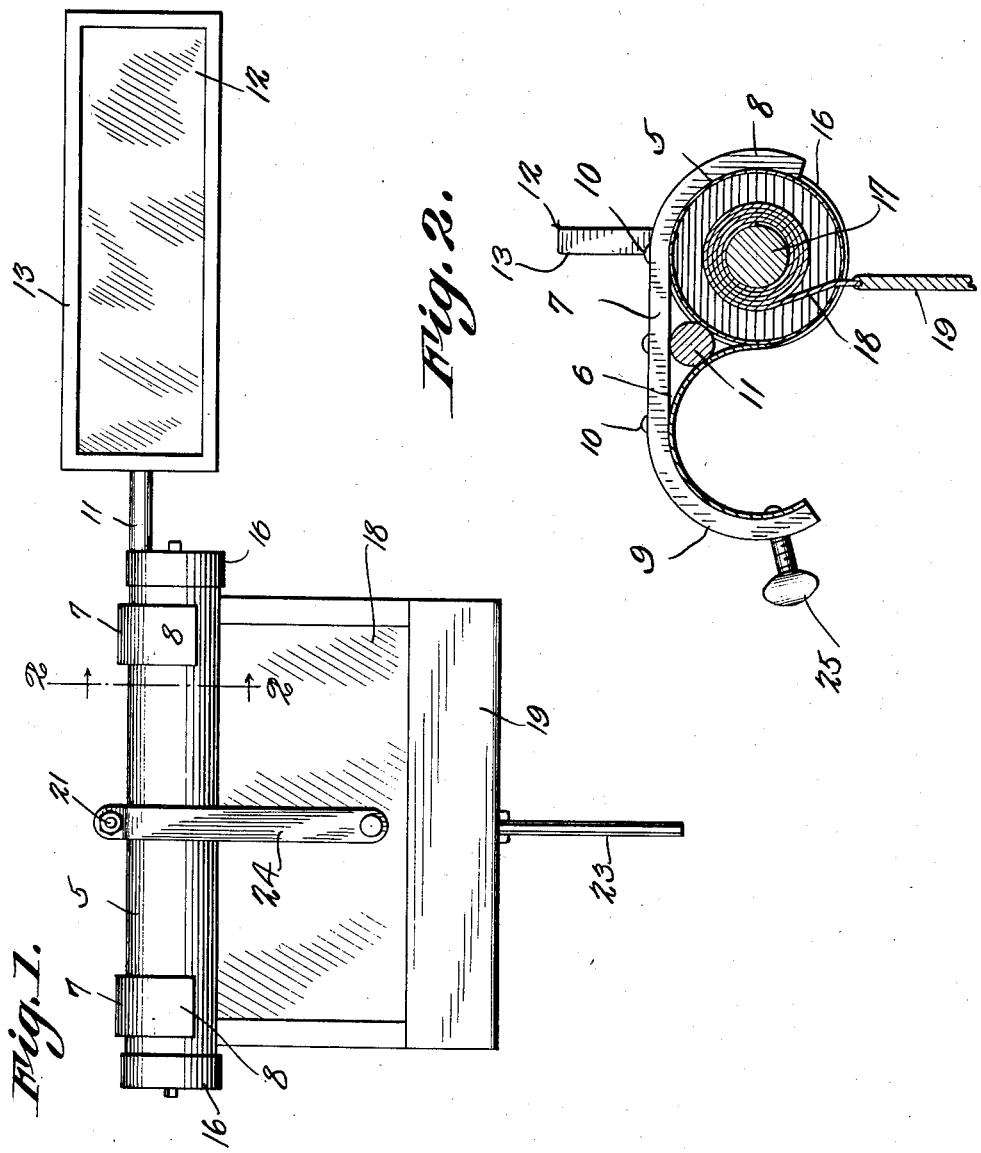
J. N. Mettel
Inventor June 22, 1926.
J. N. METTEL
1,590,048
COMBINATION MIRROR AND SUN BLINDER
Filed Jan. 20, 1926     2 Sheets-Sheet 2
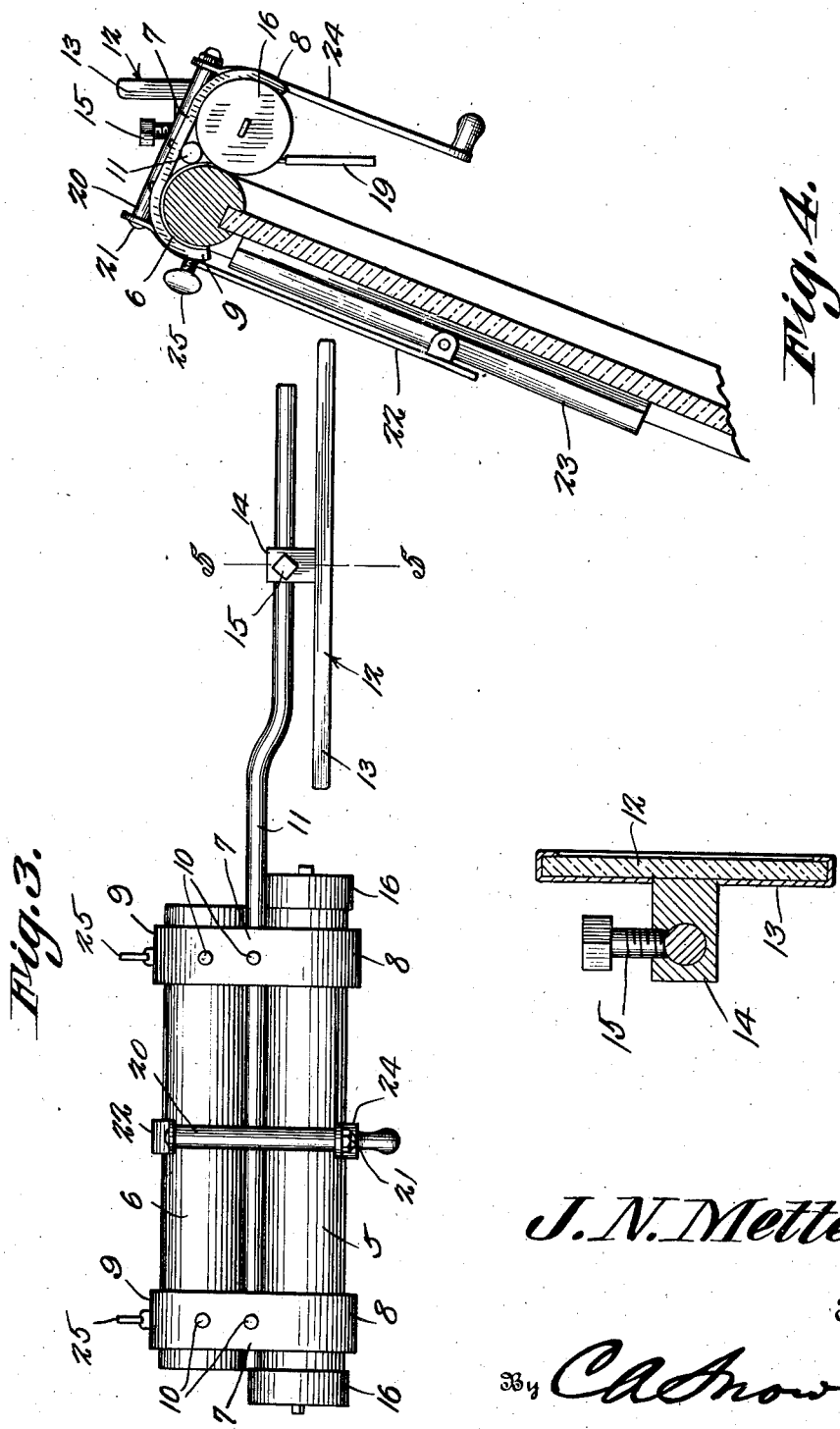

Patented June 22, 1926.

1,590,048

UNITED STATES PATENT OFFICE.

JOHN N. METTEL, OF DUBUQUE, IOWA.

COMBINATION MIRROR AND SUN BLINDER.

Application filed January 20, 1926. Serial No. 82,589.

The present invention has reference to a windshield attachment, the same embodying a windshield wiper, anti-glare shield and mirror support, and aims to provide a novel construction wherein a plurality of accessories may be supported by a single support.

Another important object of the invention is to provide a device of this character wherein the same may be readily and easily positioned over the uppermost bar of a windshield frame in a manner to be securely held against movement.

A still further object of the invention is to provide a device of this character which may be readily and easily secured by persons unfamiliar with mechanics, eliminating the necessity of making alterations in the usual construction to install the attachment.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a device constructed in accordance with the invention.

Figure 2 is a sectional view taken on line 2—2 of Figure 1.

Figure 3 is a plan view of the device.

Figure 4 is a side elevational view of the device as positioned on a windshield.

Figure 5 is a sectional view taken on line 5—5 of Figure 3.

Referring to the drawings in detail, the device embodies a support including a tubular member 5 and a curved plate 6 arranged in parallel relation with the tubular member 5 as clearly shown by Figure 3.

Connecting arms indicated at 7 are arranged adjacent to the ends of the support and are provided with curved extremities 8 and 9 respectively, the curved extremities being designed to embrace portions of the members 5 and 6 to hold the members 5 and 6 together, rivets 10 being provided for securing the arms 7 to the members 5 and 6.

Inasmuch as these members 5 and 6 are curved, a space is provided between the members 5 and 6 as shown by Figure 2, which space accommodates the rod 11 which is of a length to extend beyond one end of the support, where the same is offset as shown in Figure 3, providing a support for the mirror 12.

The mirror 12 is mounted in a frame 13 to which the lug 14 is secured, the lug 14 being provided with an opening to accommodate the rod 11 to adjustably support the mirror there being provided a set screw 15 as extending through the lug and engaging the rod 11 to secure the mirror in its positions of adjustment.

The ends of the tubular member 5 are closed by caps 16 which are removable, but of diameters to set up a binding action with the tubular member to hold the caps against movement.

Mounted within the tubular member is a roller 17 on which the anti-glare shield 18 is wound, the anti-glare shield being constructed preferably of suitable translucent flexible material such as celluloid or the like, there being provided an operating strip 19 secured along the lower edge of the shield 11 to prevent buckling of the shield and insure the same being properly operated.

Secured to the support at a point substantially intermediate its ends is a tubular bearing 20 in which the shaft 21 moves, which shaft has connection with the arm 22 that carries the windshield wiper 23, the opposite end of the shaft being connected with the operating handle 24 whereby the shaft 21 may be operated to cause the wiper 23 to sweep the windshield and clean the same.

From the foregoing it will be obvious that due to the construction shown and described, the attachment may be readily and easily secured in position, eliminating the necessity of making changes in the usual windshield construction to apply the same.

It might be further stated that a set screw 25 extends through the lower end of each arm 7, which set screws afford means whereby the device may be clamped in position.

I claim:

In a device of the character described, a support including a tubular section, a curved plate secured to the tubular section, connecting arms having curved end portions, adapted to embrace portions of the tubular section and the curved plate to secure the tubular section and curved plate together, means for securing the support to a windshield, said tubular member and said curved plate being connected to provide a space therebetween, a rod extending through the space and secured therein, and a mirror adjustably supported on the rod.

In testimony that I claim the foregoing as my own, I have hereto affixed my signature.

JOHN N. METTEL.